WELL PACKER APPARATUS

Original Filed June 9, 1958 3 Sheets-Sheet 1

INVENTOR.

DON G. CAMPBELL

BY

Meelin and Hanscom

ATTORNEYS.

WELL PACKER APPARATUS

Original Filed June 9, 1958 3 Sheets-Sheet 2

INVENTOR.
DON G. CAMPBELL
BY
Mellin and Hanscom
ATTORNEYS.

WELL PACKER APPARATUS

Original Filed June 9, 1958 3 Sheets-Sheet 3

INVENTOR.
DON G. CAMPBELL
BY
Mellin and Hanscom
ATTORNEYS.

United States Patent Office

Re. 25,846
Reissued Aug. 31, 1965

25,846
WELL PACKER APPARATUS

Don G. Campbell, Downey, Calif., assignor to Baker Oil Tools, Inc., Los Angeles, Calif., a corporation of California Original No. 3,055,430, dated Sept. 25, 1962, Ser. No. 740,708, June 9, 1958. Application for reissue Sept. 9, 1964, Ser. No. 406,650
17 Claims. (Cl. 166—122)

Matter enclosed in heavy brackets [ ] appears in the original patent but forms no part of this reissue specification; matter printed in italics indicates the additions made by reissue.

The present invention relates to subsurface well apparatus, and more particularly to well packers adapted to be set in well bores.

An object of the present invention is to provide an improved well packer adapted to be anchored in packed-off condition in a well bore.

Another object of the invention is to provide a well packer containing its own source of energy for setting the packer in a well bore, the packer being relatively short and compact, economical to manufacture, and capable of withstanding relatively high pressures.

A further object of the invention is to provide a well packer adapted to be lowered in a well bore on a wire line, and containing its own source of energy for setting the packer in the well bore and for releasing the wire line therefrom, the well packer being compact and of strong and sturdy construction, enabling it to withstand comparatively large forces encountered in a well bore.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but is to be understood that such detailed description is not to be taken in a limiting sense, since the scope of the invention is best defined by the appended claims.

Referring to the drawings.

Figure 1:
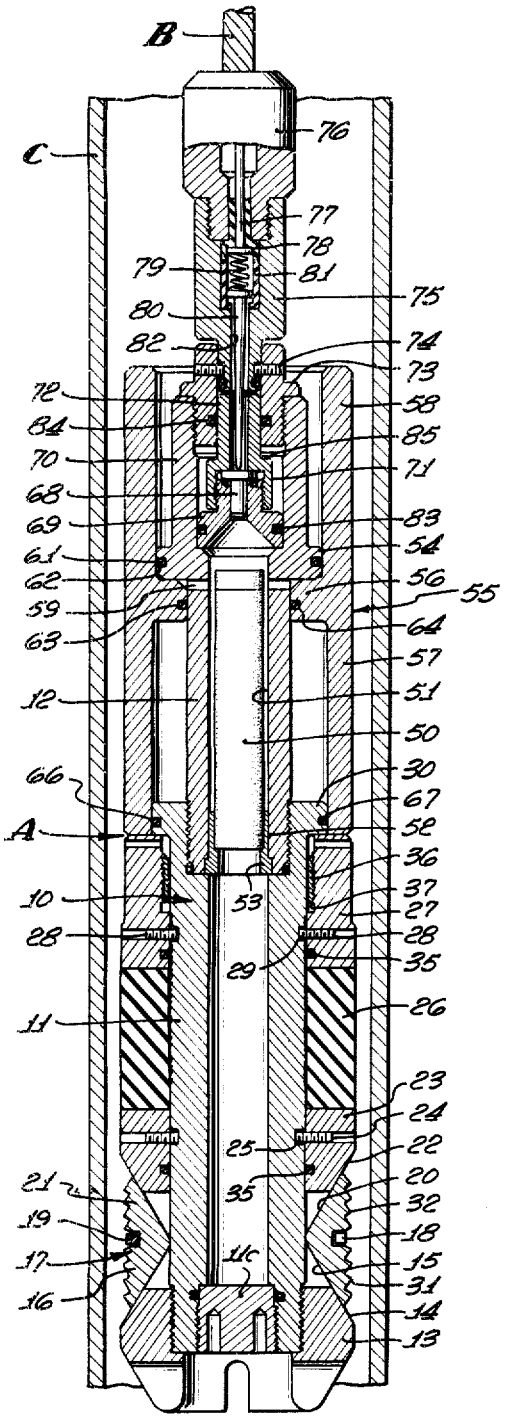
FIG. 1 is a longitudinal section through an embodiment of the invention, with certain of its parts initially in a retracted position.

As disclosed in the drawings, it is desired to lower a well packer A, such as a bridge plug, on a running-in string, such as a wire line B, to a desired point in a well casing C disposed in a well bore at which the well packer is to be anchored in packed-off condition against the well casing. After the setting operation of the well packer A in the well casing C has been completed, the wire line B is released from the well packer and can be removed upwardly through the well bore to the top of the hole.

As specifically shown[,] *in* the embodiment illustrated in FIGS. 1 to 5, inclusive, a main body 10 is provided, including a lower section 11, which may be tubular, that is threadedly secured to an upper section 12, which is also tubular. A plug 11c is threaded in the lower end of the body member 11 to close the passage through the body. Threadedly secured to the lower portion of the lower body member 11 is a guide and lower expander 13 having a tapered expander surface 14 inclined in *an* upward and inward direction for coaction with companion surfaces 15 formed on the lower portions 16 of segmental slips 17 surrounding the body 10 and initially held in retracted positions with respect thereto by an encompassing split, inherently contractile snap ring 18 disposed within a circumferential groove 19 provided collectively in the segmental slips at their midportion. The segmental slips 17 also have upper tapered surfaces 20 in their upper portions 21, which surfaces are inclined in a downward and inward direction for coaction with a companion tapered surface 22 on an upper expander 23 slidable relative to the body 10 of the tool, but initially releasably secured thereto, as by one or a plurality of shear screws 24 threaded laterally in the expander and extending into a peripheral groove 25 in the body.

Surrounding the body 10 is a packing structure of sleeve 26 which may be made of rubber or rubber-like material, the lower end of which engages the upper expander 23 and the upper end of which engages an upper abutment or setting sleeve 27 initially releasably secured to the body member 11 by one or more shear screws 28 threaded laterally in the setting sleeve 27 and received within a peripheral groove 29 in the body 11 of the tool. The upper end of this setting ring or abutment 27 is adjacent an outwardly direction flange 30 constituting the upper portion of the lower body section 11, and which also serves as a lower piston portion of a fluid operated mechanism for setting the well packer A in the well casing C.

It is to be noted that the lower portion 16 of each slip 17 has wickers or teeth 31 facing it in upward direction, so as to anchor the well tool A against upward movement in the well casing. The upper portion 21 of each slip has wickers 32 facing in a downward direction, to engage the well casing C and prevent downward movement of the well packer A therewithin.

The slips 17 and packing 26 are expanded into engagement with the well casing by relatively moving the upper abutment or setting ring 27 downwardly and the body 10 of the tool and the lower expander member 13 upwardly. Such movement will at first effect a shearing or disruption of the sets of screws 24, 28 holding the upper expander 23 to the body and the setting ring 27 to the body of the tool, after which the upper expander 23 will move toward the lower expander 13 causing the upper and lower expanders to relatively shift behind the slips 17 and, by virtue of the coengaging tapered surfaces 24, 20 and 14, 15, shift the slips outwardly until the upper and lower wickers 32, 31 are embedded in the wall of the well casing C. Outward expansion of the slips 17 is not prevented by the split, snap ring 18 which will merely expand as the slips expand. The split ring 18 has the purpose of holding the slips 17 in a central position when the apparatus is being run in the well casing, and also in a retracted position with respect to the body 10.

After the slips 17 have engaged the wall of the well casing, a continuation of the downward movement of the setting ring 27 with respect to the body 10 will move such ring toward the upper expander 23, foreshortening the rubber packing [sleeves] *sleeve* 26 and expanding it outwardly into sealing engagement with the wall of the well casing C and the periphery of the body 10, preventing leakage of fluid both externally around the packing sleeve and internally thereof. If desired, as further assurance against leakage of fluid along the exterior of the body 10, side seals 35, such as rubber or rubber-like O rings, may be disposed in the setting ring 27 and the upper expander 23 for sealing engagement against the periphery of the body 10 of the tool.

The packer A is retained anchored in packed-off condition by preventing relative upward movement of the upper abutment and setting ring 27 along the body 10, although downward movement relative to the body is permitted. As specifically disclosed, a split latch ring or sleeve 36 is disposed in a counterbore 37 in the setting ring 27. This sleeve has internal ratchet teeth 38 facing in an upward direction and adapted to engage external ratchet teeth 39, facing in a downward direction, on the periphery of the body 10. In the event the setting ring 27 tends to move upwardly along the body 10, or, conversely, the body 10 tends to move downwardly relative to the setting ring 27, external cam elements 40 on the ratchet or lock ring 36 will engage companion internal cam elements 41 on the setting ring 27, which will urge the ratchet teeth 38 inwardly and hold them in engagement with the body teeth 39. The particulars of the lock device between the setting ring 27 and the body 10 of the tool form no part of the present invention. They may be found in the patent to John R. Baker and Martin B. Conrad, 2,647,584, patented August 4, 1953, for "Well Packer and Bridge Plugs for Well Bore."

The well packer A is set in the well casing by means of fluid pressure. The source of fluid pressure is within the well packer itself: It may be derived from a power charge or propellant 50 contained within a pressure chamber 51 in the upper body member 12. This propellant or power charge 50 contains its own source of oxygen. When its upper portion is ignited, it will burn away progressively in a downward direction to produce a gas at a gradually increasing pressure for action upon the fluid operated portion of the tool, to set the well packer A in the well casing C.

As specifically shown in the drawings, the lower portion of the power charge 50, which may be in stick form or contained within a suitable tube, is confined within a supporting sleeve 52 having a lower flange 53 which may be clamped between the upper and lower body sections 12, 11 when they are screwed together. The upper portion of the body has an upper annular piston 54 along which a cylinder 55 can slide. This cylinder has a head 56 extending inwardly of a cylinder sleeve 57 and slidably engaging the upper body portion 12 below the upper piston 54. Extending upwardly from the cylinder head 56 and slidable along the upper piston 54 is an upper cylinder skirt 58. The lower cylinder skirt or sleeve 57 depends from the cylinder head 56 and is slidable along the lower piston or body portion 30. This lower skirt or sleeve portion 57 is engageable with the upper end of the setting ring 27 of the well packer A.

The pressure developed in the pressure chamber 51 resulting from the combustion of the power charge 50, passes through radial ports 59, formed through the upper body portion 12 immediately below the upper piston 54, into an annular cylinder space 60 provided between the upper piston 54 and the cylinder head 56. To prevent leakage of fluid from such space 60 in an upward direction, a suitable seal ring 61, such as a rubber or rubber-like O ring, is provided in a piston ring groove 62 for slidable sealing against the inner wall of the upper cylinder skirt or sleeve portion 58. Leakage of fluid in a downward direction from the cylinder space 60 is prevented by a suitable side seal 63, such as a rubber or rubber-like O ring, in an internal groove 64 in the cylinder head 56 slidably and sealingly engaging the periphery of the upper body portion 12 below the ports 59.

It is preferred that the well bore fluid be prevented from entering the space 65 between the cylinder head 56 and the lower piston 30. Accordingly, a suitable seal 66, such as a rubber or rubber-like O ring is provided in a ring groove 67 in the lower piston 30, which slidably and sealingly engages the inner wall of the lower cylinder sleeve 57. The annular space 65 between the cylinder head 56 and the lower piston 30 originally will contain air at atmospheric pressure.

The upper end of the power charge 50 is ignited by the firing of a blank cartridge or igniter 68 contained within a gun barrel 69 disposed within the upper part 70 of the upper body member 12. This gun barrel is threadedly attached to a breech-block or cap 71 between which the cartridge 68 is clamped in leak-proof relation, an upward extension 72 of the cap being slidable in a sub 73 threaded within the upper end of the body portion 70 of the well packer. This sub 73 is detachably secured, by means of shear screws 74, to a firing head 75 extending within the sub, the firing head being threadedly secured onto a cable head 76 to which the wire line B is suitably secured, in a known manner, the wire line B extending to the top of the well bore.

The wire line B has an electrical conductor (not shown) therein which is electrically connected to an upper connector element 77 extending through an insulator 78 contained in the cable and firing heads 76, 75. The lower end of this upper connector 77 engages a conducting helical spring 79 bearing against the upper portion of a conductor pin 80, which extends through another insulator 81 within the firing head 75. The conductor pin 80 extends through an enlarged passage 82 in the firing head 75 and in the cap extension 72, being spaced therefrom so as to avoid contact therewith. The spring 79 holds the lower end of the conductor pin 80 in the engagement with a contact at the upper end of the cartridge 68. The cartridge has a filament (not shown) therein within its power charge (not shown) connected at one end to the contact and the other end to ground. Thus, when the circuit at the top of the well bore is closed it will be completed through the conductive line in the wire line B, the connector 77, the connector spring 79, conductor pin 80, cartridge filament to ground, the circuit at the upper end of the well bore also being grounded.

When the circuit is completed, the heating of the filament will ignite the powder charge, and the flame emanating therefrom will ignite the upper end of the power charge 50, which may be of the type described in United States Patent Number 2,640,547. The combustion of the power charge will generate gas at an increased pressure in the pressure chamber 51. This gas under pressure is prevented from leaking upwardly out of the pressure chamber by providing a suitable side seal 83 on the gun barrel, such as a rubber or rubber-like O ring, sealingly engaging the inner wall of the upper body member extension 70. Similarly, leakage of external fluid into the upper end of the body 10 along the cap 71 is prevented by a suitable side seal 84, such as a rubber or rubber-like O ring, in the sub 73 and engaging the periphery of the cap extension 72. The gas under pressure will pass through the ports 59 into the annular cylinder space 60 between the upper piston 54 and the cylinder head 56, urging the cylinder head downwardly and the upper piston 54 of the body 10 upwardly. Such gas under pressure is effective in expanding the slips 17 and the packing structure 26 into engagement with the wall of the well casing.

Figure 2:
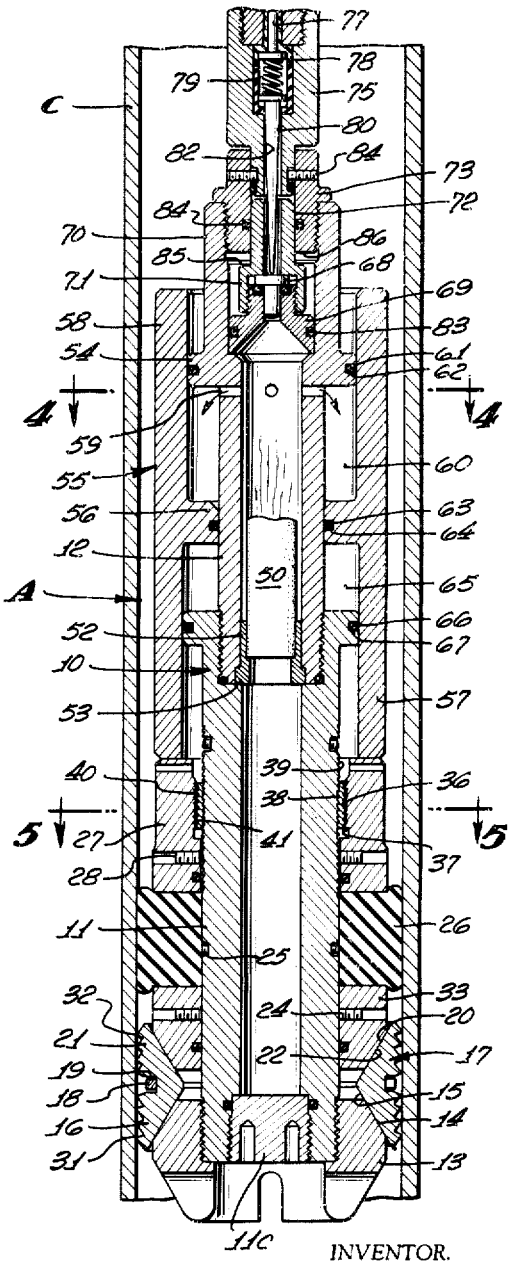
FIG. 2 is a view similar to FIG. 1 showing the well packer anchored in packed-off condition in the well bore.

In the use of the apparatus, the well packer A is secured to the lower end of the wire line B by means of the shear pins 74. An upwardly directed shoulder 85 on the cap 71 is at first spaced below the lower end 86 of the sub 73, the upper end of the cap extension 72 being adjacent the firing head 75. The apparatus is lowered in the well casing C to the desired point at which the well packer A is to be set therein (FIG. 1). When this location is reached the circuit to the igniter 68 is completed to fire the latter. The flame emanating from the cartridge will ignite the upper end of the power charge or propellant 50, a fluid pressure then being developed within the pressure chamber 51 as the result of the combustion of propellant. This gas under pressure acts upwardly on the gun barrel 69 urging it upwardly within the body 10 and causing it to urge the firing head 75 upwardly out of the sub 73. However, such movement is resisted by the shear screws 74 which have a much greater shear value than the shear screws 28, 24 holding the setting ring 27 and the upper expander 23 to the body 10 of the tool. The gas under pressure passes through the ports 59 into the annular cylinder space 60, shifting the cylinder 55 downwardly and acting in an upward direction on the piston 54 to relatively urge the body 10 upwardly. When the pressure of the burning propellant 50 increases sufficiently to overcome the force of the shear screws 28, 24 holding the setting ring 27 and upper expander 23 to the body 10 of the tool, such screws are disrupted, the cylinder 55 then moving the setting ring 27 downwardly of the body 10, and the body relatively upwardly of the setting ring, to move the expanders 23, 13 toward one another and urge the slips 17 outwardly into anchoring engagement with the wall of the well casing C. Continued increase in the pressure developed within the chamber 51 and in the cylinder space 60 urges the upper abutment or setting ring 27 towards the upper expander 26 to foreshorten the packing sleeve 26 and expand it outwardly into sealing engagement with the wall of the well casing C and the periphery of the body 10. Such pressure will also be exerted through the packing sleeve 26 upon the upper expander 23, to move it firmly behind the slips 17 and embed the slip wickers 31, 32 into the well casing, the same forces acting in an upward direction on the body 10 of the tool to cause the lower expander 13 to be urged upwardly behind the slips 17 and embed the wickers more firmly into the wall of the well casing. The ratchet sleeve 36 will move down along the body ratchet teeth 39 freely as the setting ring 27 moves downwardly of the body, but will preclude return movement of the setting ring 27 along the body 10 (FIG. 2).

Figure 3:
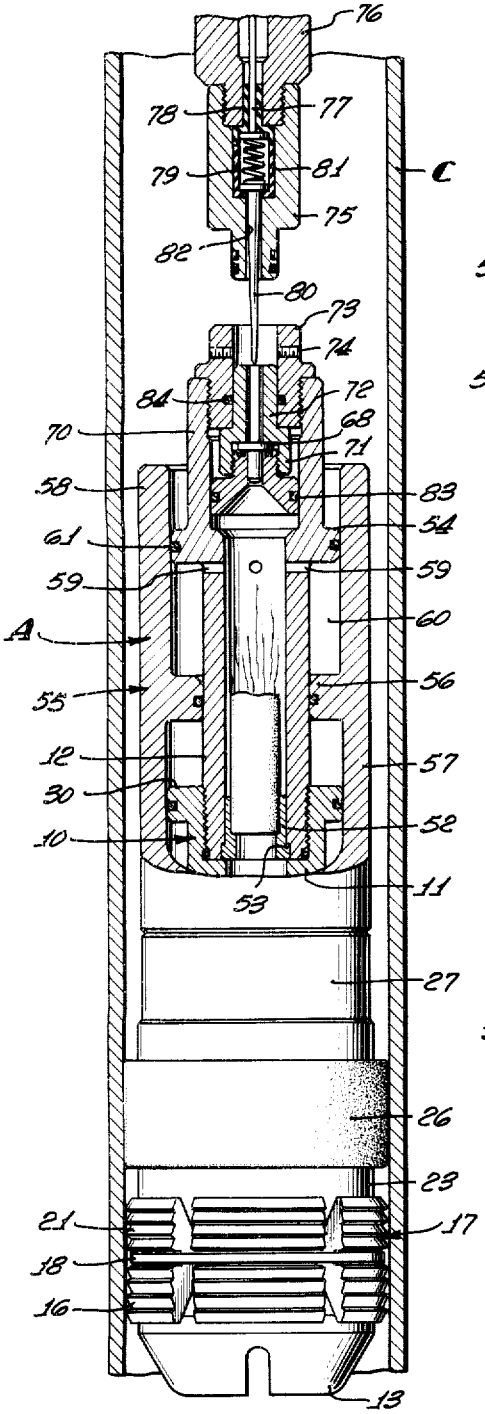
FIG. 3 is a view corresponding to FIGS. 1 and 2, with a portion of the well packer shown in side elevation, the packer being anchored in packed-off condition in the well bore and the running-in string released therefrom.
Figure 4:
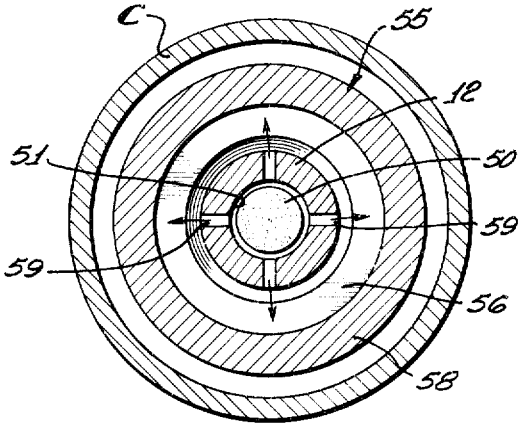
FIG. 4 is an enlarged cross-section taken along the line 4—4 on FIG. 2.
Figure 5:
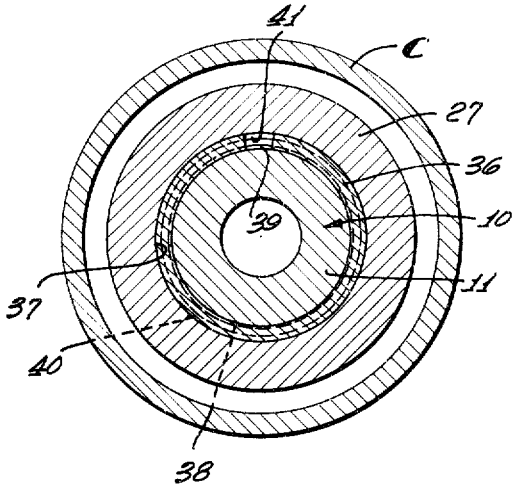
FIG. 5 is an enlarged cross-section taken along the line 5—5 on FIG. 2.

As burning of the power charge or propellant 50 proceeds, the pressure of the gases developed will increase further, to more firmly set the packing sleeve 26 against the well casing and the slips 17 in the wall of the well casing. When the pressure increases sufficiently, it acts in upward direction on the gun barrel 69 and through the extension 72 on the firing head 75 to overcome the strength of the shear screws 74 and disrupt the latter, which will disconnect the firing head 75 from the sub 73 (FIG. 3). When the shear screws 74 are disrupted, the gun barrel 69 and cap 71 can only move a slight distance, determined by engagement of the cap shoulder 85 with the lower end 86 of the sub 73. The firing head 75 is now free from the body 10 of the well packer, and the wire line B can be elevated, to elevate the firing head 75 and the elements contained therewithin with it and remove them from the well casing.

After the shear screws 74 have been disrupted and the firing head 75 released from the well packer A, the pressure can continue to increase, as a result of the continued combustion of the power charge 50, and can more firmly set the well packer A in packed-off condition in the well casing. Eventually a maximum pressure will be reached upon complete burning of the power charge, but subsequent cooling of the gases produced thereby will decrease the pressure. However, the packing 26 and slips 17 will remain set with maximum force against the well casing B, because of the locking action of the lock sleeve 36 between the setting ring 27 and the body 10 of the tool.

It is preferred that the full pressure developed within the tool be available for setting the apparatus in the well bore, and that none of this pressure be required to overcome the hydrostatic head of the fluid in the well casing B. To accomplish this purpose, the cylinder 55 is pressure-balanced, by causing the lower cylinder sleeve 57 to slide along the lower piston 30 in leakproof fashion with respect thereto. This prevents the well bore fluid from entering the confined space 65 between the cylinder head 56 and the lower piston 30. The upper and lower pistons 54, 30 have the same external diameter, which is also true of the internal diameter of the upper cylinder sleeve 58 and the lower cylinder sleeve 57. As a result, the end area of the upper cylinder sleeve 58 is equal to the end area of the lower cylinder sleeve 57, providing a balanced area condition, or no differential area over which the hydrostatic head of the well bore will tend to shift the cylinder 55 in one direction or the other.

Figure 6:
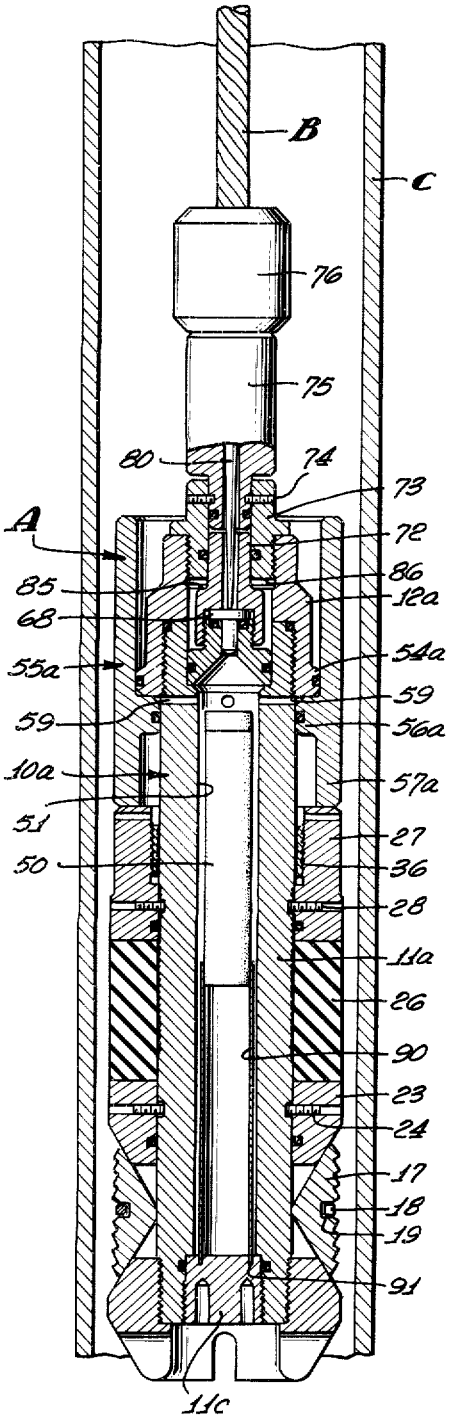
FIG. 6 is a longitudinal section showing another embodiment of the invention, with its parts in retracted position.
Figure 7:
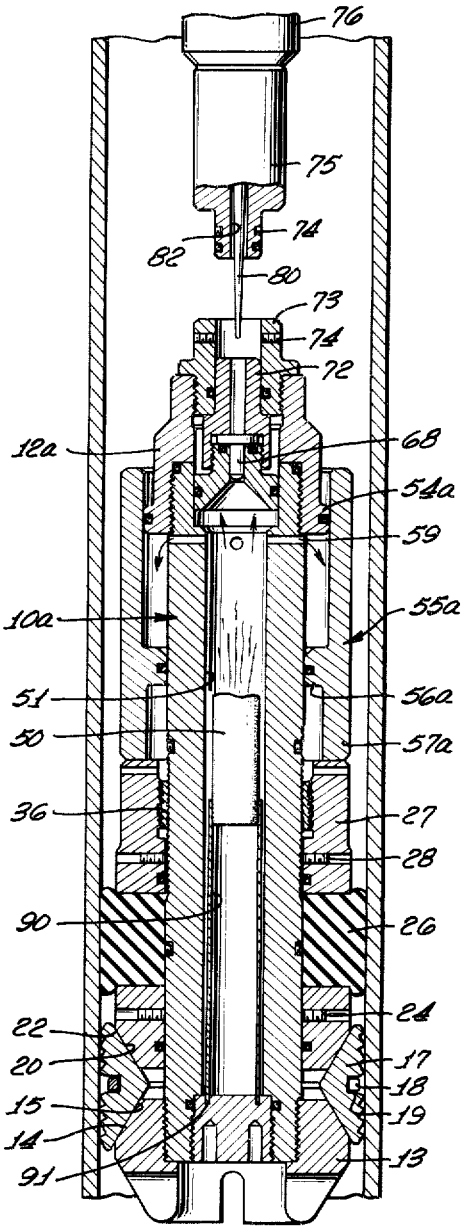
FIG. 7 is a view similar to FIG. 6, illustrating the packer anchored in packed-off condition in a well casing and the running-in string released therefrom.

The embodiment of the invention illustrated in FIGS. 6 and 7 is essentially the same as shown in FIGS. 1 to 5, inclusive. The specific form of the packer body 10a is slightly different in that the lower section 11a is threadedly secured to and within an upper body portion 12a having the upper piston 54a. The power charge or propellant 50 is held within the upper end of a supporting sleeve 90, as by being pressed therewithin, this supporting sleeve, in turn, fitting closely within an end groove 91 in the plug 11c threaded secured in the lower end of the body 11a and closing the passage in the body. The ports 59 are provided through the lower body portion 11a immediately below the upper piston 54a.

The body 10a does not have a lower piston, and for that reason a lower cylinder skirt is not slidable along such a head. In other words, the cylinder 55a is not balanced against the hydrostatic head of fluid, which must be overcome by the pressure developed within the packer apparatus. The cylinder sleeve 57a engages the setting ring 27 of the well packer. For that matter, the apparatus can be shortened somewhat by eliminating the cylinder sleeve 57a and having the cylinder head 56a engage the upper end of the setting sleeve 27.

The apparatus disclosed in FIGS. 6 and 7 operates in the same manner as the other form of invention. Completion of the circuit to the igniter 68 causes the flame emanating therefrom to ignite the upper end of the power charge or propellant 50. The developed gases will pass through the ports 59 and act downwardly on the cylinder head 56a, forcing the cylinder 55a in a downward direction and acting through the piston 54a on the body 10a to urge the latter in an upward direction. When sufficient force has been developed, the shear screws 24, 28 will be disrupted and the cylinder and setting ring 27 moved downwardly relative to the body 10a to expand the slips 17 into anchoring engagement with the wall of the well casing and the packing sleeve 26 into sealing engagement with the casing wall. When the pressure developed in the tool exceeds the strength of the shear screws 74 holding the firing head 75 to the body sub 73, the gun barrel will disrupt such screws, its upward movement within the body being limited by engagement of the cap shoulder 85 with the lower end 86 of the sub. The wire line B, cable head 76, firing head 75, and the electrical conductive elements connected directly thereto can then be removed from the well casing C. Pressure can continue to be generated in the packer body 10a to effect a firmer setting of the slips 17 and the packing sleeve 26 against the wall of the well casing.

It is to be noted that the packers are short and compact, and are yet of sturdy construction. Their various portions are made of readily drillable materials, such as cast iron, which permits a well packer to be disintegrated by a drilling bit after it has served its purpose in the well casing. The fact that the well packer is relatively short will result in its disintegration by the drill bit in a much shorter period of time than would otherwise be required, effecting large economies through the saving in rig time.

The well packer is capable of withstanding very high pressures imposed thereon from above the well packer, or which may be imposed thereon from below the well packer. The slips 17 anchor the well packer against movement in both directions within the well casing, the packing sleeve remaining sealed off against pressure in both directions in the well casing, preventing leakage of fluids thereby.

The inventor claims:

1. In a well packer: a body having a passage; slips disposed around said body; a lower expander below said slips permanently fixed to said body and engageable with said slips; an upper expander above said slips slidable along said body and engageable with said slips; packing means around said body above said upper expander; an annular piston secured to said body; an annular cylinder slidable along said piston and body and engageable with said packing means; said body having a port below said piston through which fluid under pressure within said body passage can be directed into said cylinder, said piston and body together having a resultant transverse surface facing downwardly and said cylinder having a resultant transverse surface facing upwardly, whereby said fluid under pressure acts on both transverse surfaces to shift said cylinder downwardly and said body upwardly to urge said packing means and second expander toward said first expander and expand said packing means and slips outwardly.

2. In a well tool: a body having a passage; means for securing said body to a running-in string for lowering the well tool in a well bore; normally retracted means on said body; a first annular piston secured to said body; a second annular piston secured to said body; an annular cylinder engageable with said normally retracted means and including a head slidable along said body between said pistons and first and second sleeve portions slidable along said first and second pistons, respectively; sealing means for preventing leakage between said head and body and between said pistons and sleeve portions; said body having a port through which fluid under pressure within said body passage can be directed into said cylinder between said head and one of said pistons to shift said head toward the other of said pistons to expand said normally retracted means; *said body, head, other of said pistons, and the sleeve portion slidable along said other of said piston together providing a confined space into which well bore fluid cannot enter to prevent such well bore fluid from acting on said head in opposition to the action on said head of the fluid under pressure in said body passage.*

3. In a well tool: a body having a passage; means for securing said body to a running-in string for lowering the well tool in a well bore; normally retracted means on said body; a first annular piston secured to said body; a second annular piston secured to said body; an annular cylinder engageable with said normally retracted means and including a head slidable along said body between said pistons and first and second sleeve portions slidable along said first and second pistons, respectively; sealing means for preventing leakage between said head and body and between said pistons and sleeve portions; said body having a port through which fluid under pressure within said body passage can be directed into said cylinder between said head and one of said piston to shift said head toward the other of said pistons to expand said normally retracted means; the cross-sectional areas of said sleeve portions being substantially equal to each other; *said body, head, other of said pistons, and the sleeve portion slidable along said other of said pistons together providing a confined space into which well bore fluid cannot enter to prevent such well bore fluid from acting on said head in opposition to the action on said head of the fluid under pressure in said body passage.*

4. In a well tool: a body having a passage; slips disposed around said body; expander means for shifting said slips laterally outward; a first annular piston secured to said body; a second annular piston secured to said body; an annular cylinder for shifting said slips and expander means longitudinally relative to each other, said cylinder including a head slidable along said body between said pistons and first and second sleeve portions slidable along said first and second pistons, respectively; said cylinder terminating at the ends of said sleeve portions; sealing means for preventing leakage between said head and body and between said pistons and sleeve portions; said body having a port through which fluid under pressure within said body passage can be directed into said cylinder between said head and one of said pistons to shift said head toward the other of said pistons to expand said slips; *said body, head, other of said pistons, and the sleeve portion slidable along said other of said pistons together providing a confined space into which well bore fluid cannot enter to prevent such well bore fluid from acting on said head in opposition to the action on said head of the fluid under pressure in said body passage.*

5. In a well packer: a body having a passage; slips disposed around said body; a first expander fixed to said body and engageable with said slips; a second expander slidable relative to said body and engageable with said slips; packing means around said body engageable with said second expander; a first annular piston secured to said body; a second annular piston secured to said body; an annular cylinder for shifting said packing means and second expander toward said first expander to expand said packing means and slips outwardly, said annular cylinder including a head slidable along said body between said pistons and first and second sleeve portions slidable along said first and second pistons, respectively; said cylinder terminating at the ends of said sleeve portions; sealing means for preventing leakage between said head and body and between said pistons and sleeve portions; said body having a port through which fluid under pressure within said body passage can be directed into said cylinder between said head and one of said pistons to shift said head toward the other of said pistons to expand said slips and packing means.

6. In a well packer: a body having a passage; slips disposed around said body; a first expander fixed to said body and engageable with said slips; a second expander slidable relative to said body and engageable with said slips; packing means around said body engageable with said second expander; a first annular piston secured to said body; a second annular piston secured to said body; an annular cylinder for shifting said packing means and second expander toward said first expander to expand said packing means and slips outwardly, said annular cylinder including a head slidable along said body between said pistons and first and second sleeve portions slidable along said first and second pistons, respectively; said cylinder terminating at the ends of said sleeve portions; sealing means for preventing leakage between said head and body and between said pistons and sleeve portions; said body having a port through which fluid under pressure within said body passage can be directed into said cylinder between said head and one of said pistons to shift said head toward the other of said pistons to expand said slips and packing means; the cross-sectional areas of said sleeve portions being substantially equal to each other.

7. In subsurface well apparatus: a body; slips disposed around said body; a first expander fixed to said body and engageable with said slips; a second expander slidable relative to said body and engageable with said slips; packing means around said body engageable with said second expander; a first annular piston secured to said body; a second annular piston secured to said body; an annular cylinder for shifting said packing means and second expander toward said first expander to expand said packing means and slips laterally outwardly, said cylinder including a head slidable along said body between said pistons and first and second sleeve portions slidable along said first and second pistons, respectively; said cylinder terminating at the ends of said sleeve portions; sealing means for preventing leakage between said head and body and between said pistons and sleeve portions; said body having a port through which fluid under pressure within said body can be directed into said cylinder between said head and one of said pistons; a combustible charge within said body; and means for initiating combustion of said charge to produce gas under pressure for passage through said port into said cylinder; *said body, head, other of said pistons, and the sleeve portion slidable along said other of said pistons together providing a confined space into which well bore fluid cannot enter to prevent such well bore fluid from acting on said head in opposition to the action on said head of said gas under pressure.*

8. In subsurface well apparatus: a body; slips disposed around said body; a first expander fixed to said body and engageable with said slips; a second expander slidable relative to said body and engageable with said slips; packing means around said body engageable with said second expander; a first annular piston secured to said body; a second annular piston secured to said body; an annular cylinder for shifting said packing means and second expander toward said first expander to expand said packing means and slips laterally outwardly, said cylinder including a head slidable along said body between said pistons and first and second sleeve portions slidable along said first and second pistons, respectively; said cylinder terminating at the ends of said sleeve portions; sealing means for preventing leakage between said head and body and between said pistons and sleeve portions; said body having a port through which fluid under pressure within said body can be directed into said cylinder between said head and one of said pistons; means including a detachable connection for securing said body to a running-in string for lowering said body in a well bore; a combustible charge within said body; means for initiating combustion of said charge to produce gas under pressure for passage through said port into said cylinder; *said body, head, other of said pistons, and the sleeve portion slidable along said other of said pistons together providing a confined space into which well bore fluid cannot enter to prevent such well bore fluid from acting on said head in opposition to the action on said head of said gas under pressure*; and fluid pressure actuated means subject to and actuated by gas under pressure produced by said charge for releasing said detachable connection.

9. In a well tool: a body having a passage; slips disposed around said body; a lower expander below said slips permanently fixed to said body and engageable with said slips; an upper expander slidable downwardly relative to said body and engageable with said slips; packing means around said body above and engageable with said upper expander; an annular piston secured to said body; an annular cylinder slidable along said piston and body and engageable with said packing means; said body having a port through which fluid under pressure within said body passage can be directed into said cylinder, said piston and body together having a resultant transverse surface facing downwardly and said cylinder having a resultant transverse surface facing upwardly, whereby said fluid under pressure acts on both transverse surfaces to shift said cylinder downwardly and said body upwardly to shift said packing means and second expander downwardly toward said first expander to expand said packing means and slips outwardly; a combustible charge within said body; and means for initiating combustion of said charge to produce gas under pressure for passage through said port into said cylinder.

*10. In a well tool: body means; means for securing said body means in a running-in string for lowering the well tool in a well bore; normally retracted means on said body means; a first annular piston secured to said body means; a second annular piston secured to said body means; an annular cylinder engageable with said normally retracted means and including a head slidable along said body means between said pistons and first and second sleeve portions slidable along said first and second pistons, respectively; sealing means for preventing leakage between said head and body means and between said pistons and sleeve portions; and means providing a fluid pressure in said cylinder between said head and one of said pistons to shift said head toward the other of said pistons to expand said normally retracted means; said body, head, other of said pistons, and the sleeve portion slidable along said other of said pistons together providing a confined space into which well bore fluid cannot enter to prevent such well bore fluid from acting on said head in opposition to the action on said head of said fluid pressure in said cylinder.*

*11. In a well tool: body means; means for securing said body means to a running-in string for lowering the well tool in a well bore; normally retracted means on said body means; an upper annular piston above said normally retracted means and secured to said body means; a lower annular piston above said normally retracted means and secured to said body means; an annular cylinder above and engageable with said normally retracted means and including a head slidable along said body means between said pistons and upper and lower sleeve portions slidable along said upper and lower pistons, respectively; sealing means for preventing leakage between said head and body means and between said pistons and sleeve portions; and means providing a fluid pressure in said cylinder between said head and upper piston to shift said head toward said lower piston to expand said normally retracted means; said body, head, lower piston, and lower sleeve portion together providing a confined space into which well bore fluid cannot enter to prevent such well bore fluid from acting on said head in opposition to the action of said fluid pressure in said cylinder.*

*12. In a well tool: body means; means for securing said body means to a running-in string for lowering the well tool in a well bore; normally retracted means on said body means; a first annular piston secured to said body means; a second annular piston secured to said body means; an annular cylinder engageable with said normally retracted means and including a head slidable along said body means between said pistons and first and second sleeve portions slidable along said first and second pistons, respectively; sealing means for preventing leakage between said head and body means and between said pistons and sleeve portions; and means providing a fluid pressure in said cylinder between said head and one of said pistons to shift said head toward the other of said pistons to expand said normally retracted means; said body, head, other of said pistons, and the sleeve portion slidable along said other of said pistons together providing a confined space into which well bore fluid cannot enter to prevent such well bore fluid from acting on said head in opposition to the action on said head of said fluid pressure in said cylinder; the cross-sectional areas of said sleeve portions being substantially equal to each other whereby fluid in the well bore externally of the well tool does not tend to shift said cylinder upwardly or downwardly along said body means.*

*13. In a well tool: body means; means for securing said body means to a running-in string for lowering the well tool in a well bore; normally retracted means on said body means; an upper annular piston above said normally retracted means and secured to said body means; a lower annular piston above said normally retracted means and secured to said body means; an annular cylinder above and engageable with said normally retracted means and including a head slidable along said body means between said pistons and upper and lower sleeve portions slidable along said upper and lower pistons, respectively; sealing means for preventing leakage between said head and body means and between said pistons and sleeve portions; and means providing a fluid pressure in said cylinder between said head and upper*

*piston to shift said head toward said lower piston to expand said normally retracted means; said body, head, lower piston, and lower sleeve portion together providing a confined space into which well bore fluid cannot enter to prevent such well bore fluid from acting on said head in opposition to the action of said fluid pressure in such cylinder; the cross-sectional areas of said sleeve portions being substantially equal to each other whereby fluid in the well bore externally of the well tool does not tend to shift said cylinder upwardly or downwardly along said body means.*

*14. In a well tool: body means; means for securing said body means to a running-in string for lowering the well tool in a well bore; slips disposed around said body means; expander means for shifting said slips laterally outwardly; a first annular piston secured to said body means; a second annular piston secured to said body means; an annular cylinder for shifting said slips and expander means longitudinally relative to each other, said cylinder including a head slidable along said body means between said pistons and first and second sleeve portions slidable along the first and second pistons, respectively; sealing means for preventing leakage between said head and body means and between said pistons and sleeve portions; and means providing a fluid pressure in said cylinder between said head and one of said pistons to shift said head toward the other of said pistons to shift said slips laterally outward; said body, head, lower piston, and lower sleeve portion together providing a confined space into which well bore fluid cannot enter to prevent such well bore fluid from acting on said head in opposition to the action of said fluid pressure in said cylinder.*

*15. In a well tool: body means; means for securing said body means to a running-in string for lowering the well tool in a well bore; slips disposed around said body means; expander means for shifting said slips laterally outward; an upper annular piston above said slips and expander means and secured to said body means; a lower annular piston above said slips and expander means and secured to said body means; an annular cylinder for shifting said slips and expander means longitudinally relative to each other, said cylinder including a head slidable along said body means between said pistons and upper and lower sleeve portions slidable along said upper and lower pistons, respectively; sealing means for preventing leakage between said head and body means and between said pistons and sleeve portions; and means providing a fluid pressure in said cylinder between said head and upper piston to shift said head toward said lower piston to shift said slips laterally outward; said body, head, lower piston, and lower sleeve portion together providing a confined space into which well bore fluid cannot enter to prevent such well bore fluid from acting on said head in opposition to the action of said fluid pressure in said cylinder.*

*16. In a well tool: body means; means for securing said body means to a running-in string for lowering the well tool in a well bore; slips disposed around said body means; expander means for shifting said slips laterally outward; an upper annular piston above said slips and expander means and secured to said body means; a lower annular piston above said slips and expander means and secured to said body means; an annular cylinder for shifting said slips and expander means longitudinally relative to each other, said cylinder including a head slidable along said body means between said pistons and upper and lower sleeve portions slidable along said upper and lower pistons, respectively; sealing means for preventing leakage between said head and body means and between said pistons and sleeve portions; and means providing a fluid pressure in said cylinder between said head and upper piston to shift said head toward said lower piston to shift said slips laterally outward; said body, head, lower piston, and lower sleeve portion together providing a confined space into which well bore fluid cannot enter to prevent such well bore fluid from acting on said head in opposition to the action of said fluid pressure in said cylinder; the cross-sectional areas of said sleeve portions being substantially equal to each other whereby fluid in the well bore externally of the well tool does not tend to shift said cylinder upwardly or downwardly along said body means.*

*17. In a well tool: body means; means for securing said body means to a running-in string for lowering the well tool in a well bore; normally retracted means on said body means; an upper annular piston above said normally retracted means and secured to said body means; a lower annular piston above said normally retracted means and secured to said body means; an annular cylinder above and engageable with said normally retracted means and including a head slidable along said body means between said pistons and upper and lower sleeve portions slidable along said upper and lower pistons, respectively; sealing means for preventing leakage between said head and body means and between said pistons and sleeve portions; and means providing a fluid pressure in said cylinder between said head and upper piston to shift said head toward said lower piston to expand said normally retracted means; said fluid pressure providing means including a passageway in said body means communicating with said cylinder between said head and upper piston; said body, head, lower piston, and lower sleeve portion together providing a confined space into which well bore fluid cannot enter to prevent such well bore fluid from acting on said head in opposition to the action of said fluid pressure in said cylinder.*

References Cited by the Examiner

The following references, cited by the Examiner, are of record in the patented file of this patent or the original patent.

UNITED STATES PATENTS

| | | | |
|---|---|---|---|
| 1,919,853 | 7/33 | Mack. | |
| 2,308,004 | 1/43 | Hart. | |
| 2,345,873 | 4/44 | Hart. | |
| 2,467,801 | 4/49 | Baker | 166—120 |
| 2,578,900 | 12/51 | Ragan. | |
| 2,672,199 | 3/54 | McKenna. | |
| 2,695,064 | 11/54 | Ragan et al. | 166—120 |
| 2,714,931 | 8/55 | Bouvier. | |
| 2,807,325 | 9/57 | Webb. | |
| 2,953,919 | 9/60 | Potts | 166—187 X |
| 3,011,555 | 12/61 | Clark | 166—122 |
| 3,055,430 | 9/62 | Campbell | 166—122 |

CHARLES E. O'CONNELL, *Primary Examiner.*